United States Patent Office 3,515,657
Patented June 2, 1970

3,515,657
PRODUCTION OF ACRYLONITRILE POLYMERS BY PHOTO - POLYMERIZATION IN AN AQUEOUS THIOCYANATE SOLUTION
Iyohiko Nakanome and Yoshihiro Uno, Saidaiji, Japan, assignors to Japan Exlan Company Limited, Kita-ku, Osaka, Japan
No Drawing. Filed June 20, 1967, Ser. No. 647,309
Claims priority, application Japan, June 25, 1966, 41/41,524
Int. Cl. C08f 1/16
U.S. Cl. 204—159.24
11 Claims

ABSTRACT OF THE DISCLOSURE

Acrylonitrile polymers are produced by photo-solution-polymerization by irradiating monomeric acrylonitrile or a mixture of more than 50% of the latter with less than 50% of ethylenically unsaturated monomer copolymerizable with acrylonitrile, in conc. aqueous (advantageously sodium) thiocyanate solution, with light having a wave length range from 340 m$\mu$ to 500m$\mu$. The polymerization is optimally effected at below 50° C. and advantageously in the presence in the polymerization system of a light sensitizer and of molecular weight controlling agent. The light rays are advantageously first passed through aqueous solutions for filtering out rays of less than 340 m$\mu$ wave length and or more than 500 m$\mu$ wave length respectively.

---

The present invention relates to a method of producing acrylonitrile homopolymers or copolymers by means of a photo-solution polymerization technique. More particularly, the invention relates to a method of producing a spinning solution capable of yielding substantially colorless filaments, comprising photopolymerizing acrylonitrile or a monomeric mixture of a predominant amount of acrylonitrile and a small amount of one or more ethylenically unsaturated monomers copolymerizable with acrylonitrile in an aqueous thiocyanate solution.

There have been published many literatures on the photo-polymerization of vinyl monomers. Thus, for example, it is known from British Pat. No. 830,011 that acrylonitrile monomer undergoes polymerization in a concentrated aqueous thiocyanate solution when irradiated with either ultraviolet rays or sunlight. The British patent teaches that by means of any ultraviolet light or sunlight, inasmuch as it contains a wavelength of 300 m$\mu$, acrylonitrile and other monomers may be polymerized in an aqueous thiocyanate solutions. However, if acrylonitrile or a monomeric mixture of, predominantly, acrylonitrile and, in lesser amounts, one or more ethylenically unsaturated monomers copolymerizable with acrylonitrile is photo-polymerized in an aqueous thiocyanate solutions by means of light rays of such wavelength range, there will be formed a colored polymer or copolymer solution which will by no means yield satisfactorily white fiber. It has, thus, been considered to be very difficult to manufacture an acrylonitrile polymer or copolymer solution yielding a fiber possessing a satisfactory degree of whiteness by means of photo-polymerization.

We have found that when acrylonitrile or a monomeric mixture of, predominantly, acrylonitrile and, in lesser amounts, one or more ethylenically unsaturated monomers copolymerizable with acrylonitrile is photo-polymerized in an aqueous thiocyanate solution, an acrylonitrile polymer or copolymer solution which has been considerably less discolored may be obtained in high yields, if the polymerization system is irradiated with near-ultraviolet light within the particular wavelength range of from 340 m$\mu$ to 500m$\mu$.

Thus, the invention is based on the finding, which represents a radical departure from the conventional way of thinking, that neither ultraviolet ray below 340 m$\mu$ nor visible light rays above 500 m$\mu$ in wavelength contributes to the photo-sensitizing effect of the thiocyanate, but rather tends to cause an extensive coloration of the reaction product (the polymer or copolymer solution).

A primary object of the present invention is to produce an acrylonitrile polymer or copolymer solution, which is substantially colorless, in high yields by irradiating acrylonitrile or a monomeric mixture of, predominantly, acrylonitrile, and, in lesser amounts, one or more ethylenically unsaturated monomers copolymerizable with acrylonitrile with near-ultraviolet rays within a certain critical wavelength range in a thiocyanate-containing aqueous medium.

Another object is to produce a spinning dope or solution capable of forming acrylic polymer filaments possessing a high degree of whiteness.

Other objects will become apparent from the following description of the invention.

Generally speaking, the objects of the present invention are accomplished by polymerizing acrylonitrile or a monomeric mixture of a predominant amount (more than 50% by weight) of acrylonitrile and a small amount (less than 50% by weight) of one or more ethylenically unsaturated monomers copolymerizable with acrylonitrile in a thiocyanate containing aqueous medium by means of irradiation with near-ultraviolet rays the wavelengths of which range from 340 m$\mu$ to 500 m$\mu$.

In order that the method of this invention may be successfully carried out, it is essential to employ a polymerization vessel which transmits light rays of the near-ultraviolet range, such as the one made of, for example, quartz glass.

As the thiocyanate to be used in the method of this invention, any of the salts of ammonium, potassium, sodium, calcium, lead, barium, etc., may be employed, although it is preferable to employ sodium thiocyanate from the standpoint of polymerization velocity. The concentration of the thiocyanate in the aqueous solution should be from 36% by weight to saturation (i.e. 63% by weight).

The reaction medium may generally be concentrated aqueous thiocyanate solution, to which, if desired, it is possible to add small amounts of such alcohol hydroxyl group-containing liquids as methyl alcohol, ethyl alcohol, ethyl alcohol, ethylene glycol monomethylether, ethylene glycol monomethylether, diacetone alcohol and ethyl lactate (containing —CH(OH)—); isobutyl alcohol, isopropyl alcohol and other secondary alcohols; acetyl acetone; and the like.

While the present invention does not require the use of a photosensitizer, it is by no means objectionable to add a suitable photosensitizer for the purpose of reducing the polymerization reaction time. The said photosensitizer may be selected from the class consisting of the conventional sensitizers such as di-t-butylperoxide, benzophenone, benzaldehyde, benzoin, $\beta$-naphthaldehyde, azobisisobutylonitrile, and the like. It should be noticed, however, that those sensitizers which tend to decompose the thiocyanate, e.g. hydrogen peroxide, cannot be employed.

It is also possible to add a chain transfer agent (e.g. mixture of sodium pyrosulfite and acid; mercaptoacetic acid; mercaptopropionic acid, etc.) for the purpose of molecular weight control, as well as acid or alkali for controlling the pH of the polymerization system 2–8. The chain transfer agent may be added in an amount less than about 2% by weight based upon the monomer.

The photo-polymerization reaction of the invention is substantially insensitive to temperatures, and can proceed within a temperature range from −70° C. to 150° C., although the preferred range is from 0° C. to 50° C. While it depends on the polymerization medium used, the reaction velocity is lowered when temperatures below 0° C. are employed, while a comparatively high polymerization velocity is attached when the reaction is conducted at temperatures above 50° C., but, in the latter case, the advantage of higher velocity is virtually set off by some coloration of the resulting polymer solution.

As regards the possible source for near-ultraviolet rays from 340 mμ to 500 mμ, use may be made of, for example, high-pressure mercury vapor lamps which are commercially available, the 440-watt high pressure mercury vapor lamp HQ–400Q (Japan Storage Battery Co., Ltd. of Kyoto, Japan) having the wavelength range of 300 mμ to 460 mμ, and the 2-kilowatt high pressure mercury vapor lamp HQ–2000-6G (Japan Storage Battery Co., Ltd.), as well as sunlight. In the case of sunlight, all the rays of wavelengths below 340 mμ and above 500 mμ should be filtered out. To shield off the rays of wavelengths below 340 mμ, one of the possible methods is to pass the light through a solution of cumarine in ethanol ($10^{-3}$ mol/liter) or aqueous solution of 2-aminopyridine ($10^{-3}$ mol/liter) so that the rays below 340 mμ are absorbed. The rays of wavelengths beyond 500 mμ may be absorbed by guiding the sunlight through a 5% aqueous solution of copper sulfate or an aqueous solution of potassium dichromate ($10^{-3}$ mol/liter). In order to initiate and proceed the polymerization it is necessary to conduct the irradiation so that the monomer as dissolved in the aqueous medium would absorb at least 0.2 gram rad of the light.

The ethylenically unsaturated monomers copolymerizable with acrylonitrile that may be employed in the method of this invention iclude, for example, acrylic acid, methacrylic acid, acrylic acid esters such as ethyl acrylate, methylacrylate, butyl acrylate, octyl acrylate, methoxyethyl acrylate, phenyl acrylate, cyclohexyl acrylate, dimethylamideethyl acrylate, etc., methacrylic acid esters such as methyl methacrylate, ethyl methacrylate, butyl methacrylate, octyl methacrylate, methoxyethyl methacrylate, phenyl methacrylate, cyclohexyl methacrylate, dimethylamideethyl methacrylate, etc., acrylic acid amides and methacrylic acid amides as well as the alkylation products thereof, various unsaturated ketones such as methylvinyl ketone, phenylvinyl ketone, methylisopropyl ketone, etc., esters of alpha-beta-carboxylic acids such as vinyl formate, vinyl acetate, vinyl propionate, vinyl butyrate, vinyl thiolacetate, vinyl benzoate, etc., N-alkylmaleinimide, N - vinylcarbazole, N - vinylsuccinimide, N-vinylphthalimide, vinyl ether, vinyl pyridines such as 2-vinyl pyridine, 4-vinyl pyridine, 2-methyl-5-vinyl pyridine, etc., styrene and its alkylation products, allyl alcohol, vinyl chloride, vinylidene chloride, unsaturated sulfonic acids such as allylsulfonic acid, styrenesulfonic acid, etc., as well as various salts thereof, and certain cyclic compounds such as beta-propiolactone.

The monomer concentration in the reaction system should be less than 50% by weight.

The following examples are given to further illustrate the invention. It should be understood, however, that the invention is by no means limited thereto. In the example, all percents and parts are by weight unless otherwise specified. The APHA (American Public Health Association) indexes referred to in the examples were arrived at by calculating the absorption of the light ray of 430 mμ by means of the standard APHA curve, and it should be noted that the higher the index, the greater the coloration of the sample.

EXAMPLE 1

A 50 ml. (approx.) test tube of quartz glass was charged with 3.6 g. monomeric mixture of 90 parts acrylonitrile and 10 parts methyl acrylate, and 26.4 g. of 47% aqueous solution of sodium thiocyanate. After the air trapped in the upper free space of the test tube was replaced with nitrogen gas, the tube was sealed. Photopolymerization of the monomeric mixture was conducted in a water bath thermostatically held at 30° C. by irradiating the tube at a distance of 5 centimeters for 30 minutes with with the ultraviolet light of a HQ–400Q high pressure mercury vapor lamp (300 mμ–400 mμ, Japan Storage Battery Co., Ltd.), which had been guided through a solution of cumarine in ethanol ($10^{-3}$ mol/liter) so that the rays of wavelengths below 340 mμ had been absorbed. The quartz glass tube was removed from the water bath, and was unsealed. It was found that the resulting product (copolymer solution) remained substantially colorless, with its APHA index being 138. The product was poured in methanol to precipitate the copolymer, which was collected by filtration. After washing, the copolymer was dried at 80° C. The copolymer yield was 44.9%.

On the other hand, a polymerization was carried out under the same condition as above, using the same HQ–400Q high pressure mercury vapor lamp, except that the ultraviolet rays of wavelengths below 340 mμ were not filtered off. The resulting product had a yellowish cast and its APHA index was 270. The copolymer yield was 44.8%.

It will be apparent from the above results that the polymerization yield is not affected all even if the ultraviolet rays below 340 mμ were filtered out and that the coloration of the resulting polymer is thereby reduced to a substantial extent.

EXAMPLE 2

In the same manner as Example 1, acrylonitrile was copolymerized with each of the monomers indicated in Table 1. The relative amounts of acrylonitrile and the other monomer to be copolymerized therewith were 90 parts and 10 parts, respectively. The results are summarized in Table 1.

TABLE 1

| Monomer to be copolymerized | Ultraviolet rays between 340 mμ filtered out (Method of invention) | | Not filtered | |
|---|---|---|---|---|
| | APHA index | Polymerization yield, percent | APHA index | Polymerization yield, percent |
| Styrene | 60 | 53.5 | 128 | 53.4 |
| Vinyl acetate | 65 | 65.6 | 319 | 65.8 |
| N-methylolacrylamide | 42 | 55.0 | 94 | 55.2 |

EXAMPLE 3

In the same manner as Example 1, 12 g. monomeric mixture of 85 parts acrylonitrile and 15 parts of methyl acrylate was photo-polymerized in 18 g. 60%-aqueous solution of sodium thiocyanate by irradiating the same at 30° C. for 4 hours with the ultraviolet light of a HQ–400Q high pressure mercury vapor lamp (wavelength range: 300 mμ–460 mμ, Japan Storage Battery Co., Ltd.) which had been passed through an aqueous solution of 2-aminopyridine ($10^{-3}$ mol/liter) to absorb its ultraviolet rays below 340 mμ. The resulting copolymer solution was found to have remained substantially colorless, with its APHA index being 55. The polymerization yield was 96%.

On the other hand, when the light rays of wavelengths below 340 mμ were not shielded out, the copolymer had a pale yellowish cast, with its APHA index being 190.

EXAMPLE 4

In the same manner as Example 1, 2.5 g. acrylonitrile was polymerized in 35 g. 47.5%-aqueous solution of sodium thiocyanate and 0.025 g. azobisisobutylonitrile by irradiating the same at −40° C. for 2 hours with the near-ultraviolet light of an HQ-400Q high pressure mercury vapor lamp (wavelength range: 300 m$\mu$–460 m$\mu$, Japan Storage Battery Co., Ltd.), filtered by a solution of cumarine in ethanol ($10^{-3}$ mol/liter) to filter out the rays below 340 m$\mu$. The resulting polymer slurry was found to have remained substantially colorless, with its APHA index being 53. The same polymer solution was poured in methanol so that the polymer was precipitated and collected by filtration. After washing, the polymer was dried at 80° C., whereupon a white powder was obtained. The polymer yield was 74.1%.

On the other hand, when the light rays of wavelengths below 340 m$\mu$ were not filtered out, the resulting polymer solution showed an APHA index of 124. The powder prepared from the polymer solution (by following the same procedures as above) was found to have a pale yellowish cast. The polymer yield was 74.3%.

EXAMPLE 5

In the same manner as in Example 1, acrylonitrile (referred to as AN) and methyl acrylate (referred to as MA) were copolymerized in various proportions for 3 hours. The results are summarized in Table 2.

TABLE 2

| | Ultraviolet rays below 340 m$\mu$ filtered off (present invention) | | Not filtered | |
|---|---|---|---|---|
| | APHA index | Polymerization yield, percent | APHA index | Polymerization yield, percent |
| AN/MA: | | | | |
| 50/50 | 50 | 100 | 140 | 100 |
| 75/25 | 70 | 100 | 180 | 100 |
| 100/0 | 90 | 100 | 230 | 100 |

EXAMPLE 6

In the same manner as Example 1, 6 g. acrylonitrile was photo-polymerized in 24 g. 47%-aqueous solution of sodium thiocyanate and 0.5% (relative to monomer) benzaldehyde photosensitizer by irradiating the same at 30° C. for 30 minutes with the light of an HQ-400Q high pressure mercury vapor lamp (wavelength range: 300 m$\mu$–460 m$\mu$, Japan Storage Battery Co., Ltd.), filtered by a solution of cumarine in ethanol ($10^{-3}$ mol/liter) to absorb the ultraviolet rays of wavelengths less than 340 m$\mu$. The resulting polymer solution was found to have remained substantially colorless, with its APHA index being 41. The polymer yield was 95.3%.

On the other hand, when a similar photo-polymerization was conducted without shielding off the ultrtviolet rays of wavelengths less than 340 m$\mu$, the resulting polymer slurry was found to have a pale yellowish cast, with its APHA index being 170. The polymer yield was 96.1%.

EXAMPLE 7

In a quartz glass cylinder filled with a solution of cumarine in ethanol ($10^{-3}$ mol/liter) was placed an HQ-400Q high pressure mercury vapor lamp (Japan Storage Battery Co., Ltd.). This device, adapted to filter off ultraviolet rays of wavelengths less than 340 m$\mu$, was positioned centrally within a 1.5-liter reaction vessel. The internal temperature of the reaction vessel was held at 50° C. by means of its jackets. The vessel was continuously supplied with 16 parts of monomeric mixture of 90 parts acrylonitrile and 10 parts methyl acrylate, as well as 84 parts 47.6%-aqueous solution of sodium thiocyanate and 1% and 0.5% (relative to monomer), respectively of sodium pyrosulfite and acetic acid (as molecular weight regulating agents) at such a rate that the average residence times of the contents was 90 minutes. The reaction product, i.e. the polymer solution, formed under the influence of the ultraviolet light emitted by the above ultraviolet source was continuously withdrawn from the vessel. The APHA index of the polymer solution was 65, and the polymer yield was 67%.

When the slurry was extruded through spinning orifices in 12% solution of sodium thiocyanate at 0° C., filaments possessing an excellent degree of whiteness were obtained.

On the other hand, when a similar reaction was conducted with the same lamp whose ultraviolet rays of wavelengths less than 340 m$\mu$ remained unfiltered, the resulting product, i.e. polymer solution, was found to have an APHA index of 206. The filaments extruded from the above solution into 12% aqueous solution of sodium thiocyanate in the same manner were pale yellow in color.

EXAMPLE 8

In a quartz glass cylinder containing aqueous solution of $10^{-3}$ mol/liter of potassium dichromate and $10^{-3}$ mol/liter of 2-aminopyridine so as to filter off all light rays of wavelengths below 340 m$\mu$ and about 500 m$\mu$ was centrally mounted a 2 kw. high-pressure mercury vapor lamp, and the resulting assembly was positioned in the center of a 23-liter reaction vessel of aluminum equipped with jackets. The same reaction vessel was charged with 12 parts of acrylonitrile and 88 parts of 47% aqueous solution of sodium thiocyanate, followed by the addition of 0.5% (relative to the monomer) mercaptoacetic acid. While the reaction temperature was held at 50° C., the contents were irradiated with the near-ultraviolet rays from said high-pressure mercury vapor lamp whose rays below 340 m$\mu$ had been filtered out as above. It has found that the resulting polymer solution remained substantially colorless, with its APHA index being 37. The polymer yield was 80%. When the above solution was extruded through spinning orifices in 12% aqueous solution of sodium thiocyanate at 0° C., filaments having an excellent degree of whiteness were obtained.

On the other hand, when a similar photo-polymerization was conducted with the same lamp whose rays below 340 m$\mu$ and above 500 m$\mu$ remained unfiltered, the resulting polymer slurry was found to be pale yellow in color, with its APHA index being 150. The filaments excluded from said solution in 12% aqueous solution of sodium thiocyanate at 0° C. had a pale yellowish cast.

EXAMPLE 9

A 50 ml. (approx.) test tube made of quartz glass was supplied with 3.6 g. of a monomeric mixture of 90 parts acrylonitrile and 10 parts of methyl acrylate, followed by the addition of 26.4 g. 47%-aqueous solution of sodium thiocyanate. After the air trapped in the upper free space of the tube was replaced with nitrogen gas, the tube was hermetically sealed. The contents were exposed to noon sunlight for 30 minutes through a filter which consisted of 5% aqueous solution of copper sulfate and $10^{-3}$ mol/liter ethanolic solution of cumarine, within a water vessel the temperature of which was thermostatically held at 30° C. Following this photo-polymerization, the resulting polymer solution was found to have remained substantially colorless, with its APHA index being 70. The polymer yield was 22.2%.

On the other hand, when a similar photo-polymerization was conducted using a filter which consisted in $10^{-3}$ mol/liter ethanolic solution of cumarine alone, the resulting polymer was found to have a pale yellowish cast, with its APHA index being 123. The polymer yield was 22.3%.

What we claim is:

1. A method of producing acrylonitrile polymers by photo-solution-polymerization which comprises irradiating a monomeric material selected from the group consisting of acrylonitrile and a mixture of more than 50% by weight of acrylonitrile and less than 50% by weight of at least one ethylenically unsaturated monomer copolymerizable with acrylonitrile in an aqueous solution of thiocyanate salt with light exclusively within a wavelength range from 340 m$\mu$ to 500 m$\mu$.

2. A method as claimed in claim 1 wherein the polymerization is conducted at a temperature of from 0° C. to 50° C.

3. A method as claimed in claim 1 wherein a light containing rays of less than 340 mµ wavelengths is passed through an aqueous solution selected from the group consisting of an alcohol solution containing $10^{-3}$ mol/liter of cumarine and an aqueous solution containing $10^{-3}$ mol/liter of 2-aminopyridine, prior to be used for the irradiation to filter off the rays of less than 340 mµ wavelengths.

4. A method as claimed in claim 1 wherein a light contained rays of more than 500 mµ wavelengths is passed through a solution selected from the group consisting of 5% aqueous solution of copper sulfate and $10^{-3}$ mol/liter aqueous solution of potassium bichromate, prior to be used for the irradiation to filter off the rays of more than 500 mµ wavelengths.

5. A method as claimed in claim 1 wherein a light sensitizer is added to the polymerization system.

6. A method as claimed in claim 5 wherein the light sensitizer is selected from the group consisting of di-t-butylperoxide, benzophenone, benzaldehyde, benzoin, β-naphthaldehyde and azobisisobutyronitrile.

7. A method as claimed in claim 1 wherein a molecular weight controlling agent is added to the polymerization system.

8. A method as claimed in claim 7 wherein the molecular weight controlling agent is selected from the group consisting of a mixture of sodium pyrosulfite and an acid, mercaptoacetic acid and mercaptopropionic acid.

9. A method as claimed in claim 1 wherein the thiocyanate is sodium thiocyanate.

10. A process as in claim 1 wherein the monomeric material is a mixture of acrylonitrile and methyl acrylate.

11. A process in accordance with claim 1 wherein the monomeric material is a mixture of acrylonitrile and ethylenically unsaturated monomer copolymerizable with acrylonitrile.

References Cited

FOREIGN PATENTS 830,011  3/1960  Great Britain

MURRAY TILLMAN, Primary Examiner

R. B. TURER, Assistant Examiner

U.S. Cl. X. R.

260—88.7, 85.5, 79.5; 204—159.22, 159.23